(12) United States Patent
Sprouse

(10) Patent No.: US 9,340,741 B2
(45) Date of Patent: May 17, 2016

(54) BIOMASS TORREFACTION MILL

(75) Inventor: Kenneth M. Sprouse, Northridge, CA (US)

(73) Assignee: Gas Technology Institute, Des Plaines, IL (US)

( * ) Notice: Subject to any disclaimer, the term of this patent is extended or adjusted under 35 U.S.C. 154(b) by 1572 days.

(21) Appl. No.: 12/556,009

(22) Filed: Sep. 9, 2009

(65) Prior Publication Data

US 2011/0057060 A1    Mar. 10, 2011

(51) Int. Cl.

| | | |
|---|---|---|
| *B02C 21/00* | (2006.01) | |
| *C10L 5/44* | (2006.01) | |
| *B02C 23/08* | (2006.01) | |
| *B02C 23/34* | (2006.01) | |
| *C10B 49/02* | (2006.01) | |
| *C10B 53/02* | (2006.01) | |
| *C10L 9/08* | (2006.01) | |
| *F26B 1/00* | (2006.01) | |
| *F26B 25/00* | (2006.01) | |

(52) U.S. Cl.
CPC . *C10L 5/44* (2013.01); *B02C 21/00* (2013.01); *B02C 23/08* (2013.01); *B02C 23/34* (2013.01); *C10B 49/02* (2013.01); *C10B 53/02* (2013.01); *C10L 9/083* (2013.01); *F26B 1/005* (2013.01); *F26B 25/005* (2013.01); *F26B 2200/02* (2013.01); *Y02E 50/10* (2013.01); *Y02E 50/14* (2013.01); *Y02E 50/15* (2013.01); *Y02E 50/30* (2013.01); *Y02P 20/145* (2015.11)

(58) Field of Classification Search
CPC .......... B02C 23/34; B02C 23/08; B02C 21/00
USPC ....................................................... 241/65–67
See application file for complete search history.

(56) References Cited

U.S. PATENT DOCUMENTS

| | | | | |
|---|---|---|---|---|
| 3,897,015 | A | * | 7/1975 | Suzuki et al. .................... 241/66 |
| 4,213,407 | A | | 7/1980 | Headley |
| 4,244,529 | A | | 1/1981 | Degabriele |
| 4,276,835 | A | | 7/1981 | Zeltner |
| 4,384,787 | A | | 5/1983 | Ito et al. |
| 4,390,285 | A | | 6/1983 | Durr et al. |
| 4,583,470 | A | | 4/1986 | Hirose |
| 4,599,954 | A | | 7/1986 | Williams |
| 4,702,927 | A | | 10/1987 | Hirotsuka et al. |
| 5,309,637 | A | | 5/1994 | Moriarty |
| 5,775,603 | A | | 7/1998 | Kohler |
| 5,839,671 | A | | 11/1998 | Sand et al. |
| 6,024,307 | A | | 2/2000 | Sand et al. |
| 6,053,441 | A | * | 4/2000 | Danforth et al. ........... 241/46.11 |

(Continued)

FOREIGN PATENT DOCUMENTS

| | | |
|---|---|---|
| DE | 1604934 | 7/1970 |
| EP | 0457203 | 11/1991 |

(Continued)

OTHER PUBLICATIONS

Partial Internal Search dated Dec. 2, 2010.

(Continued)

*Primary Examiner* — Mark Rosenbaum
(74) *Attorney, Agent, or Firm* — Pauley Erickson & Rottis

(57) ABSTRACT

A biomass torrefaction system includes a mill which receives a raw biomass feedstock and operates at temperatures above 400 F (204 C) to generate a dusty flue gas which contains a milled biomass product.

3 Claims, 2 Drawing Sheets

(56) References Cited

U.S. PATENT DOCUMENTS

| | | | |
|---|---|---|---|
| 6,085,440 | A | 7/2000 | Getler |
| 6,165,349 | A | 12/2000 | Madar |
| 6,418,973 | B1 | 7/2002 | Cox et al. |
| 6,565,312 | B1 | 5/2003 | Horn et al. |
| 6,682,005 | B2 | 1/2004 | Kantonen et al. |
| 6,755,359 | B2 | 6/2004 | Sprouse et al. |
| 6,758,386 | B2 | 7/2004 | Marshall et al. |
| 6,775,987 | B2 | 8/2004 | Sprouse et al. |
| 6,802,178 | B2 | 10/2004 | Sprouse et al. |
| 6,857,274 | B2 | 2/2005 | Sprouse et al. |
| 6,920,836 | B2 | 7/2005 | Sprouse |
| 7,007,486 | B2 | 3/2006 | Sprouse et al. |
| 7,111,463 | B2 | 9/2006 | Sprouse et al. |
| 7,117,674 | B2 | 10/2006 | Sprouse et al. |
| 7,117,676 | B2 | 10/2006 | Farhangi et al. |
| 7,481,385 | B2 | 1/2009 | Narayan et al. |
| 2006/0054726 | A1* | 3/2006 | Lippert et al. ............... 241/65 |
| 2009/0050719 | A1* | 2/2009 | Lippert et al. ............... 241/17 |

FOREIGN PATENT DOCUMENTS

| | | |
|---|---|---|
| EP | 0536650 | 4/1993 |
| EP | 1072854 | 1/2001 |
| EP | 1160294 | 12/2001 |
| EP | 1604732 | 12/2005 |
| FR | 1105997 | 12/1955 |
| FR | 2466439 | 4/1981 |
| FR | 2924435 | 6/2009 |
| GB | 1467744 | 3/1977 |
| GB | 2184042 | 6/1987 |
| JP | 57145908 | 9/1982 |
| WO | 9212796 | 8/1992 |
| WO | 2010093310 | 8/2010 |

OTHER PUBLICATIONS

International Search Report and Written Opinion mailed Mar. 22, 2012.

International Search Report and Written Opinion, PCT/US2010/047201, dated May 17, 2011.

* cited by examiner

BIOMASS TORREFACTION MILL

STATEMENT REGARDING FEDERALLY SPONSORED RESEARCH OR DEVELOPMENT

The government may have certain rights to this invention pursuant to Contract No. DE-FC26-04NT42237 awarded by the Department of Energy.

BACKGROUND

The present disclosure relates to high efficiency gasification system to support petrochemical and electrical power generation industries and more particularly to a pulverization mill therefor.

A pulverization mill is commonly utilized to dry and grind fibrous materials such as biomass and municipal solid wastes such as switch grass, corn stovers, and waste wood chips. Although the mill can size reduce fibrous feedstocks, the mill may be unable to upgrade the specific energy content of the predominantly cellulosic material to values above 8,000 Btu/lbm.

SUMMARY

A biomass torrefaction system according to an exemplary aspect of the present disclosure includes a mill which receives a raw biomass feedstock and operates at temperatures above 400 F (204 C) to generate a dusty flue gas which contains a milled biomass product. A cyclone separator downstream of the mill to at least partially separate the milled biomass product above a predetermined size from the dusty flue gas. A filter downstream of the cyclone separator to at least partially separate the milled biomass product below a predetermined size from the dusty flue gas to provide flue gas. A condenser downstream of the filter to separate steam as liquid water from the flue gas.

A method of biomass torrefaction according to an exemplary aspect of the present disclosure includes milling a raw biomass feedstock at operating temperatures above 400 F to generate a dusty flue gas which contains a milled biomass product; separating the milled biomass product above a predetermined size from the dusty flue gas to provide a flue gas; and separating steam as liquid water from the flue gas.

A mill which receives a raw biomass feedstock according to an exemplary aspect of the present disclosure includes a rotor having at least one blade, the at least one blade includes an active cooling feature.

A mill which receives a raw biomass feedstock according to an exemplary aspect of the present disclosure includes a rotor having at least one blade manufactured of a composite material.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
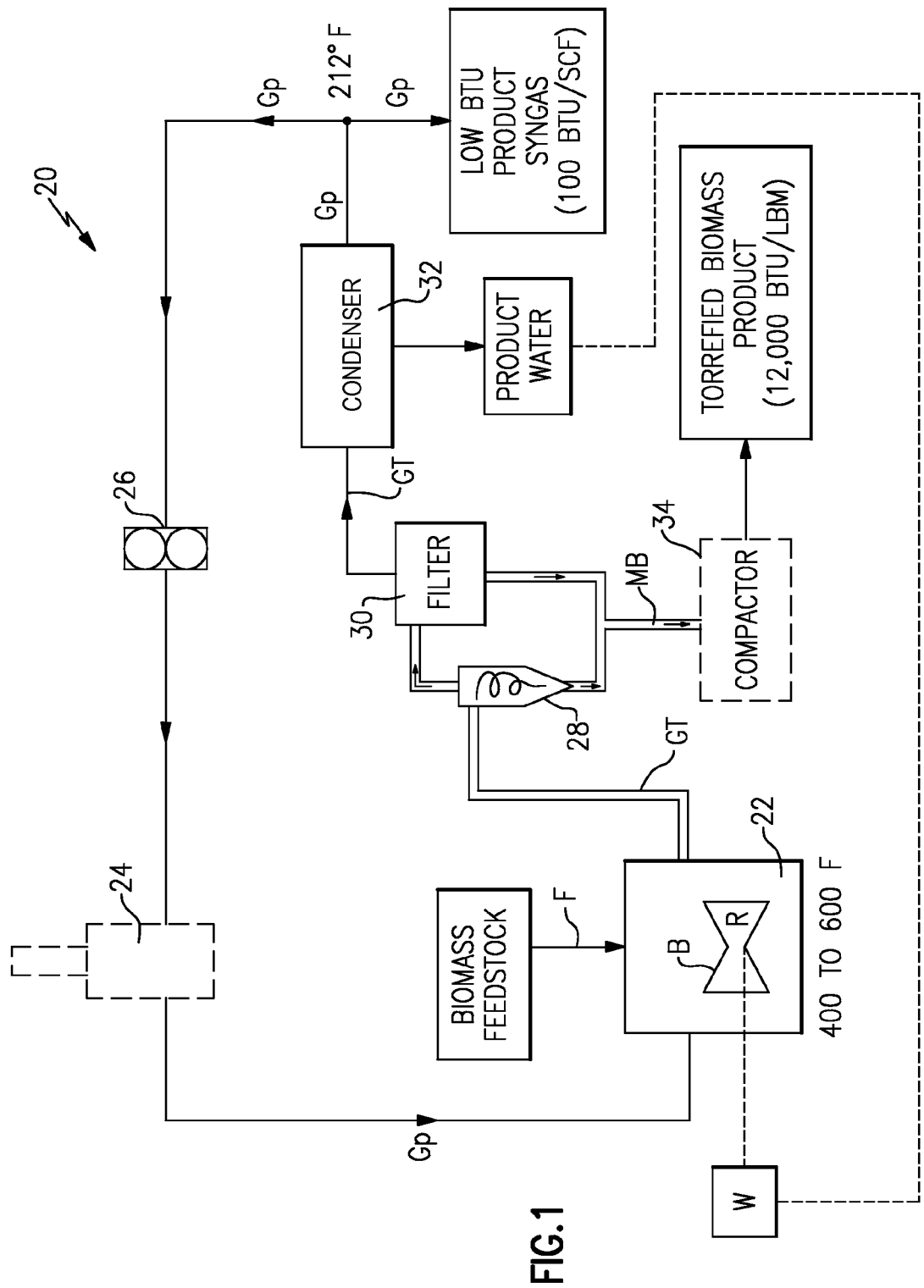
FIG. 1 is a general schematic block diagram view of a biomass torrefaction system.

FIG. 1 schematically illustrates a biomass torrefaction system 20. The biomass torrefaction system 20 generally includes a mill 22, a gas heater 24, a gas blower 26, a cyclone separator 28, a filter 30, a condenser 32, and a compactor 34. It should also be understood that although a particular component arrangement is disclosed in the schematically illustrated embodiment, other components arrangements may alternatively or additionally be utilized. For example, the gas heater 24 and the compactor 34 may be optionally incorporated.

The mill 22 is supplied with a raw biomass feedstock F such as switch grass, corn stovers, and/or waste wood chips that has been pre-processed to less than 50 wt % moisture and minus 1-inch (200 mesh) size. The raw biomass feedstock F has a heating value of approximately 7,000 Btu/lbm or less.

The mill 22 operates at elevated temperatures between 400-600 F (204-316 C) such that the raw biomass feedstock F experiences a mild pyrolysis. In one non-limiting embodiment, a rotor system R of the mill 22 may obtain tip speeds above 500 ft/sec. High tip speeds (above 500 ft/sec) within rotating components of the mill 22 can present significant design issues when the internal recirculation biomass and flue gas (i.e., dusty gas) within the mill 22 are at torrefaction temperatures above 400 F. This is generally because the conventional metals used in conventional mill construction may have significantly lower ultimate tensile strengths at these elevated torrefaction temperatures. These lower ultimate tensile strengths may not be high enough to permit effective operation of the conventional mill under the nominal tensile stress loads of 14,000 psi (produced with 500 ft/sec tip speeds). Hence, mill 22 must be modified in relation to conventional mills.

In one non-limiting embodiment, an active water cooling system (illustrated schematically at W) of a rotor system R of the mill 22 may be utilized for metal temperature suppression. The active water cooling system W may communicate a cooling fluid such as water to each blade B of the rotor system R. It should be understood that various fluid communication paths may be utilized.

In another non-limiting embodiment, the rotor system R of the mill 22 may be manufactured of light weight composite structural materials that have significantly higher strength-to-weight ratios than metal. Such composite materials may include ceramic matrix composites (CMCs) where the matrix component can be silicon carbide (SiC) which is not only light weight but also highly resistant to erosion—a desirable property for a pulverization mill's abrasive surfaces.

The mill 22 may also receive an essentially particulate free flue gas Gp at temperatures above approximately 250 F (121 C) and in one non-limiting embodiment may be approximately 500 F (260 C). The dried and pulverized biomass feedstock F and a dusty flue dusty flue gas Gt exit the mill 22 for separation through the cyclone separator 28 and the candle filter 30. The cyclone separator 28 generally utilizes a high speed rotating flow and the filter 30 may be a candle filter that utilizes cylindrical, tube-like, filter elements. In one non-limiting embodiment, the cyclone separator 28 separates out particulate greater than approximately 10 microns while the candle filter 30 separates out particulate less than approximately 10 microns such that essentially only the particulate free flue dusty flue gas Gp remains. The particulate free flue dusty flue gas Gp at this location may be approximately 60% steam.

Downstream of the cyclone separator 28 and the filter 30, the particulate free flue dusty flue gas Gp is cooled to about 212 F (100 C) within the condenser 32 to separate steam as liquid water from a dried hot particulate free flue gas Gp. Downstream of the condenser 32, a portion of the liquid water may be communicated to water cooling system W. Downstream of the condenser 32, a portion of the dried hot particulate free flue gas Gp may be communicated back to the mill 22 with the blower 26 and, if required to increase the temperature of the flue gas Gp, through operation of the gas fired heater 24.

Should the upstream gas fired heater 24 be required to maintain the internal temperature of the mill 22 between 400-600 F (204-316 C), the gas fired heater 24 is fired on a portion of the dried particulate free flue gas Gp. It should be noted that the dried particulate free flue gas Gp is essentially a low Btu synthesis gas containing hydrogen ($H_2$) and carbon monoxide (CO) among other gases such as carbon dioxide ($CO_2$) with a volumetric heating value of approximately 100 Btu/scf (standard cubic foot). Alternatively, should the gas fired heater 24 not be necessary to maintain the internal temperature of the mill 22, then essentially all of the relatively low Btu particulate free flue gas Gp can be otherwise stored or used for other local heating or power generation applications.

Alternatively, the gas fired heater 24 may not even be necessary for operation of the mill 22 at the 400-600 F (204-316 C) temperature as the mill 22 generates internal waste heat that may be sufficient for temperature maintenance in the 400-600 F (204-316 C) temperature range. That is, the dusty flue gas Gp is at least partially recirculated within the mill 22 so as to maintain the desired temperature.

The dried and pulverized biomass feedstock F exits the mill 22 as a milled biomass product MB which is separated from the dusty flue gas Gt by the cyclone separator 28 and the candle filter 30. The milled biomass product MB is of a relatively low bulk density, typically below 20 lbm/ft3. If the bulk density of the milled biomass product MB is required to be greater than approximately 20 lbm/ft3 for shipment, then the milled biomass product MB may be communicated into the compacter 34 to increase the bulk density. For example, the biomass bulk densities may be increased to over 40 lbm/ft3 with consolidation pressures below 100 psi. If the compaction process is operated in a dry mode at less than 15 wt % moisture, the milled biomass product MB from the compactor 34 may be later reconstituted to a nominal 200 mesh product size with very little energy expenditure at the use location. In-line flow sentries, such as that manufactured by Atlantic Coast Crushers Inc. of Kenilworth, N.J., have been identified for this reconstitution operation.

Figure 2:
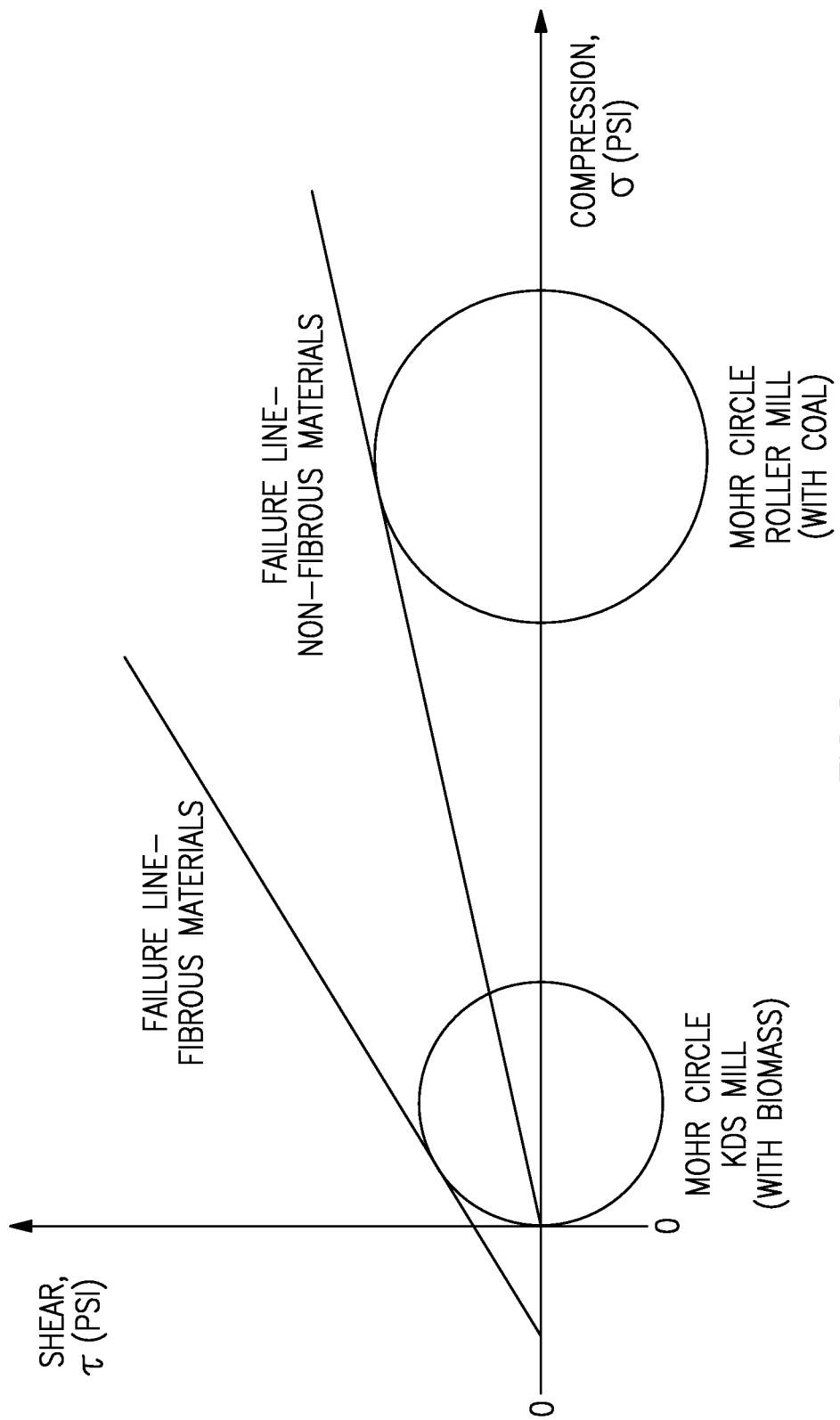
FIG. 2 is a graphical representation of solids failure lines for grinding fibrous and non-fibrous bulk materials.

Referring to FIG. 2, typical solids failure lines for grinding fibrous and non-fibrous bulk materials are graphically illustrated. For fibrous materials, the shear loads, $\tau$, required to cause solids break-up and particulate formation are significant under high compressive loads when compared to non-fibrous materials such as coal. The attempt to grind fibrous biomass in conventional hammer, roller or attrition mills typically results in plugging of the mill since such conventional mills do not develop the required shear loads, $\tau$, at normal operating compression, $\sigma$, conditions. This plugging may result in the subsequent shut-down of the mill for cleaning. Kinetic Disintegration System (KDS) mills such as that manufactured by First American Scientific Corporation (FASC) of British Columbia, Canada provides a pulverization mill that will dry and grind fibrous materials such as biomass. The KDS mill overcomes the breaking up of the fibrous materials with shear loads under very low compression so that the fibrous materials are not squeezed (i.e., compressed) between two metal surfaces but provides the biomass with a free surface where $\tau$ and $\sigma$ are both zero. Although the KDS mill size reduces the fibrous materials, the KDS mill operates at ambient to 175 F (79 C) operating temperatures and does not upgrade the specific energy content of the predominantly cellulosic material to values above 8,000 Btu/lbm.

The biomass torrefaction system 20 disclosed herein provides milling capability under low load and high temperature conditions. Operation of the mill at torrefaction temperatures of 400 to 600 F facilitates the increase of the specific heating content of the milled biomass product MB on a dry basis from approximately 7,000 Btu/lbm to over 11,000 Btu/lbm with recovery of the low Btu particulate free flue gas Gp. Furthermore, the biomass torrefaction system 20 provides for subsequently compressed material to a bulk density of over 40 lbm/ft3 to facilitate long distance shipment.

It should be understood that relative positional terms such as "forward," "aft," "upper," "lower," "above," "below," and the like are with reference to the normal operational attitude of the invention and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A mill which receives a raw biomass feedstock comprising:
   a rotor having a plurality of blades; and
   an active water cooling system that is connected to communicate water to each of the plurality of blades of the rotor, wherein said plurality of blades rotates in a steady state condition with the raw biomass feedstock at a tip speed of at least 500 ft/sec in a 400 F environment.

2. A mill which receives a raw biomass feedstock comprising:
   a rotor having a plurality of blades; and
   an active water cooling system that is connected to communicate water to each of the plurality of blades of the rotor, wherein the active water cooling system is connected to receive water from a condenser.

3. The mill as recited in claim 2, wherein the condenser is connected to receive product downstream from the mill.

\* \* \* \* \*